United States Patent [19]
Herridge et al.

[11] Patent Number: 5,660,922
[45] Date of Patent: Aug. 26, 1997

[54] COEXTRUDED PRESSURE-SENSITIVE ADHESIVE TAPE AND METHOD OF MAKING

[75] Inventors: David B. Herridge, St. Paul, Minn.; Dennis L. Krueger, Hudson, Wis.; Richard J. Rolando, Oakdale, Minn.; Ronald J. Ramirez, Hutchinson, Minn.; James E. Sax, Oakdale, Minn.

[73] Assignee: Minnesota Mining and Manufacturing Company, St. Paul, Minn.

[21] Appl. No.: 433,030

[22] Filed: May 3, 1995

Related U.S. Application Data

[63] Continuation of Ser. No. 769,548, Oct. 1, 1991, abandoned.

[51] Int. Cl.$^6$ ....................................................... C09J 7/02
[52] U.S. Cl. .................. 428/214; 428/317.3; 428/343; 428/354
[58] Field of Search ..................... 428/343, 354, 428/214, 317.3

[56] References Cited

U.S. PATENT DOCUMENTS

| | | | |
|---|---|---|---|
| Re. 24,906 | 12/1960 | Ulrich | 206/59 |
| 2,532,011 | 11/1950 | Dahlquist et al. | 154/53.5 |
| 2,607,711 | 8/1952 | Hendricks | 117/122 |
| 3,318,852 | 5/1967 | Dixon | 260/78.5 |
| 3,389,827 | 6/1968 | Abere et al. | 220/53 |
| 3,415,920 | 12/1968 | Lee et al. | 264/171 |
| 3,565,737 | 2/1971 | Lefevre et al. | 161/36 |
| 3,611,492 | 10/1971 | Scheibling | 18/13 P |
| 3,694,119 | 9/1972 | Scheibling | 425/131 |
| 3,823,211 | 7/1974 | Colombo | 264/47 |
| 3,985,348 | 10/1976 | Skidmore | 259/191 |

(List continued on next page.)

FOREIGN PATENT DOCUMENTS

| | | |
|---|---|---|
| 0 325 007 | 7/1989 | European Pat. Off. . |
| 0 411 820 A1 | 6/1991 | European Pat. Off. ............ C09J 7/02 |
| 2 600 981 | 1/1988 | France . |
| 46-21120 | 6/1971 | Japan ................................ C09J 24/91 |
| 37935 | of 1976 | Japan . |
| 51-566 | 1/1976 | Japan . |
| 58-147332 | 9/1983 | Japan . |
| 4 198 289 | 7/1992 | Japan . |
| 1138362 | 1/1969 | United Kingdom . |
| WO-A-9219447 | 11/1992 | WIPO .............................. B32B 7/06 |

OTHER PUBLICATIONS

Cloeren, P., Jr. "Feedblock Coextrusion Systems", *Coextrusion*, pp. 55–66(1986).

Schrenk, W. J., "Flow Problems in Multilayer Coextrusion" *Coextrusion*, pp. 27–34, Presented at the Society of Plastics Engineers Chicago Section, Regional Technical Conference, Oak Brook, IL, (Jun. 20–22, 1977).

Rauwendaal, C., "Coextrusion", in *Polymer Extrusion*, Hanser Publishers: Munich; pp. 453–456 (1986).

Encyclopedia of Polymer Science & Engineering, vol. 13, pp. 345–368, Wiley—Interscience Publishers (New York, 1988).

Encyclopedia of Polymer Science & Technology, vol. 1, pp. 371–405, Wiley—Interscience Publishers (New York, 1964).

*Primary Examiner*—Jenna Davis
*Attorney, Agent, or Firm*—Gary L. Griswold; Walter N. Kirn; James V. Lilly

[57] ABSTRACT

A unified, composite tape structure is provided. The tape comprises two outer pressure-sensitive adhesive layers joined via melt processing. A method of making the tape comprising the use of melt processing is also disclosed. In the method a plurality of layers are melt processed and simultaneously joined to form the unified composite.

37 Claims, 2 Drawing Sheets

U.S. PATENT DOCUMENTS

| | | | |
|---|---|---|---|
| 4,065,532 | 12/1977 | Wild et al. | 264/68 |
| 4,080,348 | 3/1978 | Korpman | 260/27 BB |
| 4,136,071 | 1/1979 | Korpman | 260/27 BB |
| 4,152,387 | 5/1979 | Cloeren | 264/171 |
| 4,169,802 | 10/1979 | Cloeren | 264/171 |
| 4,197,069 | 4/1980 | Cloeren | 425/131.1 |
| 4,206,165 | 6/1980 | Dukess | 264/45.9 |
| 4,214,261 | 7/1980 | Cloeren | 358/19 |
| 4,244,914 | 1/1981 | Ranalli et al. | 264/515 |
| 4,339,485 | 7/1982 | Shibano et al. | 428/40 |
| 4,379,806 | 4/1983 | Korpman | 428/354 |
| 4,600,550 | 7/1986 | Cloeren | 264/171 |
| 4,611,987 | 9/1986 | Hahn et al. | 425/131.1 |
| 4,619,799 | 10/1986 | Teerling | 264/101 |
| 4,693,858 | 9/1987 | Volke | 264/101 |
| 4,713,273 | 12/1987 | Freedman | 428/40 |
| 4,780,258 | 10/1988 | Cloeren | 264/171 |
| 4,789,513 | 12/1988 | Cloeren | 264/171 |
| 4,792,584 | 12/1988 | Shiraki et al. | 524/77 |
| 4,833,179 | 5/1989 | Young et al. | 522/183 |
| 4,839,206 | 6/1989 | Waldenberger | 428/40 |
| 4,888,075 | 12/1989 | Freedman | 156/243 |
| 4,889,669 | 12/1989 | Suzaki | 264/45.9 |
| 4,906,421 | 3/1990 | Plamthottam et al. | 264/22 |
| 4,946,532 | 8/1990 | Freeman | 156/243 |
| 4,952,650 | 8/1990 | Young et al. | 526/194 |
| 5,047,196 | 9/1991 | Zuckerberg et al. | 264/171 |
| 5,173,141 | 12/1992 | Leseman et al. | 156/244.15 |

COEXTRUDED PRESSURE-SENSITIVE ADHESIVE TAPE AND METHOD OF MAKING

This is a continuation of application Ser. No. 07/769,548 filed Oct. 1, 1991, now abandoned.

BACKGROUND OF THE INVENTION

1. Field of the Invention

The present invention relates to a composite pressure-sensitive adhesive tape and to a solventless method for making these tapes.

2. Description of the Prior Art

Composite pressure-sensitive adhesive tapes are known. Typically they comprise at least one adhesive layer adhered to another layer. This other layer may comprise a second layer of adhesive or a backing layer which may itself comprise several layers of material.

Techniques for the manufacture of composite pressure-sensitive adhesive tapes are also known. One technique comprises a multistep solvent coating process. Another comprises a multistep hot melt coating process. In each of these techniques the individual layers that make up the composite tape are applied sequentially. Consequently, they are time consuming and labor intensive. Solvent coating processes further necessitate the use of special handling and equipment so as to minimize hazards to workers and the environment. Both processes subject the tape to severe operating conditions (for example elevated temperature, solvent atmosphere, etc.). This necessitates the use of non-extensible, tear-resistant, heat-resistant and/or water resistant backing materials so as to withstand the rigors of the manufacturing process. However, this also limits the use of polymeric materials as the backing material to those that are oriented and/or are sufficiently thick to withstand the rigors of the manufacturing process.

An attempt to reduce the number of steps in the process involves the use of coextrusion. Such techniques are described in a number of publications. For example, U.S. Pat. No. 3,415,920 discloses the manufacture of a polyolefin encapsulated adhesive fiber by the coextrusion of an adhesive and an outer skin of polyolefin.

Japanese patent publication JP-46-21120 discloses a process for the melt extrusion of a stream of thermoplastic synthetic resin and a stream of an adhesive, guiding the two streams of resin through a single die to form a single fluid flow having separate layers made up of each stream, and forming a tape having adhesive on one side.

U.S. Pat. No. 3,823,211 discloses a method of coextruding an adhesive/backing construction in the form of a tubular film and a method of forming a bubble of the backing material followed by coating an adhesive on the inside surface of the bubble of the backing material. Both techniques result in tape having adhesive on one side.

U.S. Pat. No. 4,214,261 discloses a multilayer polypropylene film which can be prepared by coextrusion. It further discloses that an adhesive can be subsequently coated onto the multilayer film.

U.S. Pat. No. 4,379,806 discloses producing a two-layer pressure-sensitive adhesive tape. In one process a tacky, thermoplastic rubber/resin pressure-sensitive adhesive and a backing of a normally non-tacky thermoplastic resin are coextruded to provide a tape having adhesive on only one side. In another method a blown layered film of the backing and adhesive is extruded. The film is then collapsed so that the backing film is joined to itself. The adhesive and the backing each have a torque value of between about 100 meter grams and 1000 meter grams when worked at 74 rpm at 420° F. in a Brabender torque dynamometer. Additionally, the adhesive is joined to the backing "through an intermediate interlocking layer formed by controlled penetration of components during coextrusion of the film-forming and the adhesive compositions" (Col. 2, lines 3–7).

U.S. Pat. No. 4,888,075 discloses an all plastic multilayer liner and facestock for pressure-sensitive labels, tapes, etc. and a method of making such liners and facestocks. The liner/facestock is coextruded from any suitable coextrusion die such as, for example, a Cloeren "vane" die (Col. 2, lines 56–61). The pressure-sensitive adhesive is subsequently applied to the liner/facestock either by adhesive transfer from a release liner (Col. 6, lines 14–22), or in a subsequent coating step (Col. 6, lines 23–29 and FIG. 3A).

European Patent Application Publication No. 0 411 820 A1 discloses a reinforced pressure-sensitive adhesive tape and a method of making the same. The tape comprises a backing having a plurality of ribs at least partially embedded in one of its major surfaces. A pressure-sensitive adhesive is provided on at least one surface of the backing. The backing and reinforcing ribs can be coextruded together followed by application of the adhesive.

There have also been attempts to coextrude multilayer two-sided adhesive tapes directly into a nip formed between two solid surfaces. This technique has not been entirely satisfactory as the pressure on the extrudate while it is in the nip causes the adhesive to aggressively adhere to one of the surfaces. Once adhered, it is difficult to remove the adhesive.

While the tapes of these prior efforts are useful, their manufacture and conversion into an adhesive tape generally involves a series of sequential operations or extra handling which add to the cost and complexity of their preparation. The tapes disclosed in the above-mentioned publications have adhesive on only one side. To the extent that they disclose a tape having adhesive on both sides, they do so only through a multi-step process, rather than one in which the entire tape is produced via a single melt processing step.

SUMMARY OF THE INVENTION

The present invention provides a composite, unified pressure-sensitive adhesive tape. The composite structure has two opposed, exterior surfaces of a normally tacky pressure-sensitive adhesive. The tape of the invention is sometimes referred to herein as a "double sided" tape to indicate the presence of adhesive on both surfaces.

In one embodiment of the invention, the unified structure comprises first and second simultaneously melt processed pressure-sensitive adhesive layers. These layers are joined in the molten state and the resulting structure is cooled.

In another embodiment of the invention, the tape comprises the first and second pressure-sensitive adhesive having a thin (e.g., 15 micron thick or less) carrier layer between them. These layers are simultaneously joined together by melt processing.

In still another embodiment of the invention, the tape comprises a simultaneously melt processed construction comprising two outer pressure-sensitive adhesive layers and an internal layer that may be a foamed layer, a blend of polymers, a discontinuous layer or a series of two or more layers. In yet another embodiment of the invention, the tape comprises the first and second pressure-sensitive adhesive layers having a thick (e.g. greater than 15 micron) carrier between them. These layers are simultaneously joined together by melt processing and the resulting structure is cooled before it passes through a nip.

The tape of the invention is provided by melt processing at least two molten streams of pressure-sensitive adhesive composition, simultaneously joining them together, and depositing the joined streams onto one face of a support surface and cooling the streams to form the composite tape. In a novel process, the molten streams are simultaneously melt processed and deposited on a support surface without passing the molten composite through a nip. Thus one surface of the molten composite contacts the support while the other is free, that is it does not contact another solid surface. In this embodiment of the invention, the adhesion problems due to nipping the molten structure are avoided. Preferably the support surface employed in this novel process comprises a release liner. In this case, the opposite face of the support surface may then be contacted with a cooling means maintained at a temperature less than the melt temperature of the composite structure. The tape is preferably cooled after which it may be, nipped, wound upon itself, and cut to any desired width and/or length.

Optionally, one or more additional molten streams can be provided with and simultaneously joined between the molten streams of adhesive.

The composite tape of the invention can be provided as a construction free from any backing and/or carrier layer. Alternatively, it can be provided as a construction having a carrier layer. Because the carrier layer is simultaneously melt processed during the manufacture of the composite tape, it is not limited to any particular thickness. Thus, it can be a very thin layer (e.g., 1 micrometer or less) if so desired.

The present invention offers several unique features. For example,

It provides a tape free from paper, non-woven, or fabric backings thereby eliminating the need to purchase and maintain an inventory of various web-like backings.

It provides a composite, unified tape having pressure-sensitive adhesive on both sides wherein the adhesive layers have been simultaneously joined via melt processing.

It allows one to provide a composite, unified double sided tape having any desired carrier between the adhesive layers.

It allows one to readily produce a tape having desired properties (e.g. hand tear-ability or dispensibility) by simply varying the nature and quantity of the components employed, and/or the process conditions employed.

It provides a single step, solvent-free manufacturing process thereby eliminating the various handling, processing and solvent recovery steps encountered with the multistep processes described above.

It provides an integrated process in which raw materials are charged at one end and a finished product is obtained at the other end.

DETAILED DESCRIPTION

The tape of the invention comprises at least two adhesive layers simultaneously joined together to form a unified composite structure by melt processing.

As used herein, melt processing means the pumping and shaping of molten material into a structure. One melt processing technique useful in this invention is coextrusion. In the context of this specification, coextrusion means the simultaneous melt processing of multiple molten streams and the combination of such molten streams into a single unified structure, preferably from a single extrusion die. When a single die is used, the streams of molten material are not required to exit the die from a single outlet. The molten streams can be joined together in a feedblock, in the die, or outside the die. If the streams are joined in the die, they can come together upstream of the exit orifice (a common land die) or at the exit orifice (a zero common land die). In all cases, however, the streams are joined or combined together in proximity to the outlet of the die.

Figure 1A:
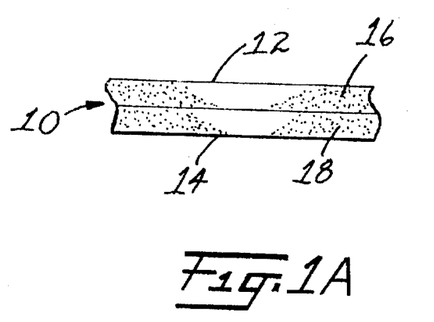
FIGS. 1A–E show a cross section of various embodiments of the tape of the invention.

The tape of the invention can be provided in several embodiments. For example, it can comprise two layers of a pressure-sensitive adhesive. Such an embodiment is shown in FIG. 1A wherein reference number 10 indicates the tape as a whole, and reference numerals 12 and 14 represent first and second exposed adhesive surfaces of first and second layers of pressure-sensitive adhesive 16 and 18 respectively.

Figure 1B:
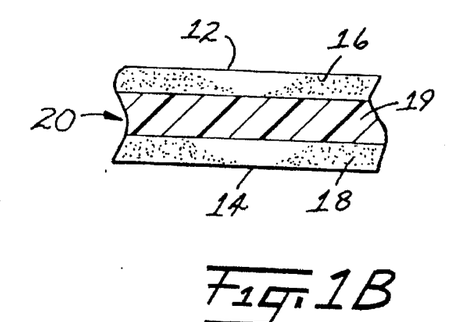

FIG. 1B represents another embodiment of the invention in which tape 20 comprises layers of 16 and 18 pressure-sensitive adhesive separated by carrier layer 19.

Figure 1C:
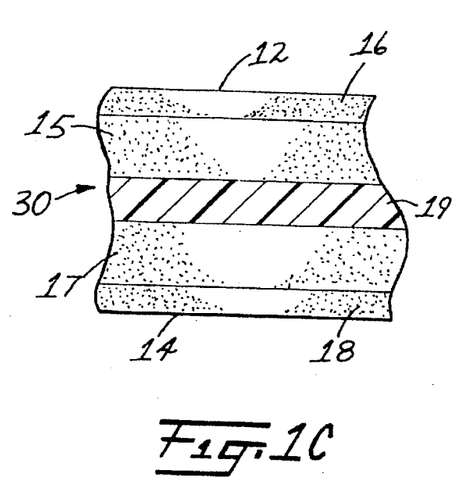

FIG. 1C represents an embodiment of the invention in which tape 30 comprises layer carrier layer 19, layers 15 or 17 of a second adhesive and layers 16 and 18 of the first pressure-sensitive adhesive.

Figure 1D:
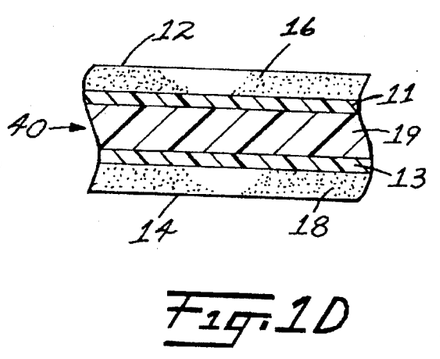

FIG. 1D illustrates an embodiment of the invention in which tape 40 has intermediate layers 11 and 13 respectively interposed between carrier 19 and adhesive 16 and between carrier 19 and adhesive 18.

Figure 1E:
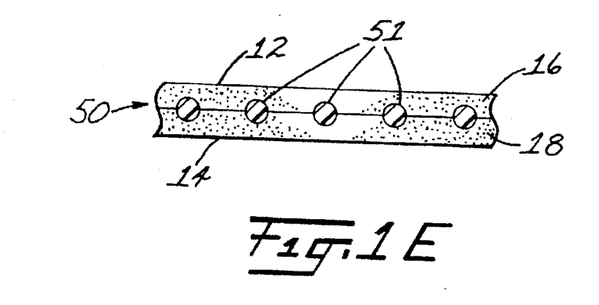

FIG. 1E shows an embodiment of the invention in which a discontinuous material is provided as the carrier layer. In this embodiment, tape 50 comprises a series of longitudinally disposed ribs or strands 51 surrounded by simultaneously extruded pressure-sensitive adhesive layers 16 and 18.

In each of these embodiments, the various layers are simultaneously melt processed. Additionally in each embodiment, each adhesive utilized may be the same as, or different than, the other(s). When the same adhesive is employed, the tape has a homogeneous composition and may appear to be a single layer construction. However, the presence of two layers of adhesive may also be observed. In all of the embodiments shown in the Figs., the use of a common adhesive as the adhesive layers results in a tape having essentially the same tack and adhesion properties on both of surfaces 12 and 14. If, however, a tape which has differential tack and/or adhesion is desired, different adhesive materials may be employed.

It is noted that the tape of the invention can employ a plurality of adjoining adhesive layers such as is shown by layers 15/16 and 17/18 in FIG. 1C. This construction permits flexibility in the design and construction of the tape and allows one to provide a tape having, for example, a high tack surface over a high shear adhesive. While this discussion has been made with reference to the adhesive tape of FIG. 1C, it is understood that any embodiment of the invention may employ multiple adhesive layers. It is further understood that the carrier layer of the various embodiments may also be provided as multiple layers.

It should also be noted that any of the layers of the tape of the invention can be of the same or different thickness as the other layers. Thus for example, layers 16 and 18 can either be of equal thickness as shown in FIG. 1A, or they can be of different thickness. While the precise thickness of these layers is not crucial to the invention, they are commonly at least 1 micrometer thick.

Pressure-sensitive adhesives useful in the invention include normally tacky, pressure-sensitive adhesives known in the art. Such adhesives may be foamed adhesives if desired. The adhesives useful herein are extrudable and typically, though not necessarily, amorphous. Furthermore, the preferred adhesives are normally tacky (at room temperature) pressure-sensitive adhesives.

Useful pressure-sensitive adhesive compositions are fluid or pumpable at the temperatures used to melt process the tape (e.g., 90° C.–300° C.). Furthermore these adhesive compositions preferably do not significantly degrade or gel at the temperatures employed during melt processing. Useful adhesive compositions also typically have a melt viscosity of from 1 centipoise (cps) to 1,000,000 poise. As used herein, the term melt viscosity means the viscosity of the molten material at the processing temperature employed.

The adhesives may generally be classified into the following categories:

Random Copolymer adhesives such as those based upon acrylate and/or methacrylate copolymers, α-olefin copolymers, silicone copolymers, chloroprene/acrylonitrile copolymers, and the like.

Block Copolymer adhesives including those based upon linear block copolymers (i.e., A-B and A-B-A type), star block copolymers, comb block copolymers, and the like.

Natural rubber adhesives.

A description of useful pressure-sensitive adhesives may be found in *Encyclopedia of Polymer Science and Engineering*, Vol. 13, Wiley-Interscience Publishers (New York, 1988). Additional description of useful pressure-sensitive adhesives may be found in *Encyclopedia of Polymer Science and Technology*, Vol. 1, Interscience Publishers (New York, 1964).

Other pressure-sensitive adhesives useful in the invention are described in the patent literature. Examples of these patents include U.S. Pat. No. Re. 24,906 (Ulrich), U.S. Pat. No. 3,389,827 (Abere et al at Col. 4–Col. 5), U.S. Pat. No. 4,080,348 (Korpman), U.S. Pat. No. 4,136,071 (Korpman), U.S. Pat. No. 4,792,584 (Shiraki et al), U.S. Pat. No. 4,883,179 (Young et al), and U.S. Pat. No. 4,952,650 (Young et al).

Commercially available pressure-sensitive adhesives are also useful in the invention. Examples of these adhesives include the hot melt pressure-sensitive adhesives available from H. B. Fuller Company, St. Paul, Minn. as HM-1597, HL-2207-X, HL-2115X, HL-2193-X. Other useful commercially available pressure-sensitive adhesives include those available from Century Adhesives Corporation, Columbus, Ohio.

Carrier layers useful in the present invention comprise extrudable polymeric materials. Useful carrier materials are fluid or pumpable at the temperatures used to melt process the tape; they do not significantly degrade at such temperatures; and they have a melt viscosity in the range of from 1 cps to 1,000,000 poise.

Inorganic materials may be employed in the carrier and/or in the adhesive layer. Examples of useful inorganic materials include calcium carbonate, titanium dioxide, glass beads or bubbles, polymeric beads or bubbles, metals particles, flame retardants, fibers, pigments, etc.

The carrier may be provided either as a continuous or a discontinuous layer. And, like the adhesive layers, it may be either a very thin layer (or small rib) (e.g., 1 micrometer) or a thick layer (or large rib) (e.g., 500 micrometers).

Numerous organic materials are useful as the carrier layer. Examples of these materials include polyolefins (including by way of example linear low density polyethylene, ultra low density polyethylene, low, medium, and high density polyethylene, polypropylene, foamed polyolefins, copolymers of polypropylene and ethylene, and blends of polyolefins (including polypropylene/polyethylene blends and polypropylene/polystyrene blends)), polyurethanes, foamed polyurethanes, polystyrene and foamed polystyrene, vinyl materials (including by way of example ethylene vinyl acetate, polyvinylidene dichloride, polyvinylchloride), polyesters, polymethyl methacrylate, and block copolymers (including by way of example A-B and A-B-A block copolymers). Blends and mixtures of these materials may also be utilized as the carrier layer.

The tape of the invention may also incorporate one or more intermediate layers between the carrier layer and the adhesive layer(s). The intermediate layer may comprise one of the materials useful as the carrier layer. Typically it is thinner than the carrier layer, although there is no absolute requirement that it be so. Thus, the intermediate layer may have a thickness in the range of from 1 to 500 micrometers, typically from 1 to 5 micrometers. These materials must meet the same melt processing criteria as the carrier layer materials to be useful herein.

One class of useful intermediate layer materials comprises a copolymer of the intermediate layer material and the carrier layer material.

Specific examples of materials useful as the intermediate layer include ethylene/vinyl acetate copolymer (preferably containing at least about 10% by weight vinyl acetate units), carboxylated ethylene/vinyl acetate copolymer such as "CXA" 3101 available from DuPont, copolymers of ethylene and methyl acrylate such as "poly-Eth" 2205 EMA available from Gulf Oil and Chemicals Co., ethylene/acrylic acid copolymer available from Dow Chemical Company, "Surlyn" (a copolymer of ethylene with a methyl acrylate) available from DuPont, maleic anhydride modified polyolefins and copolymers of polyolefins such as the "Modic" resins available from Mitsubishi Chemical Company, polyolefins containing homogeneously dispersed vinyl polymers such as the "VMX" resins available from Mitsubishi Chemical Company (such as FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%), "Polybond" (believed to be polyolefin grafted with acrylic acid) available from B. P. Chemicals Inc., "Plexar" (believed to be a polyolefin grafted with polar functional groups) available from Quantum Chemicals, Inc., a copolymer of ethylene and acrylic acid such as "Primacor" available from Dow Chemical Company, and a copolymer of ethylene and methacrylic acid such as "Nucrel" available from DuPont. If desired, the intermediate layer materials may be employed to form the carrier layer.

Preferably the ratio of the melt viscosity of any material used as a layer herein to the melt viscosity of any other material used as a layer herein is in the range of from 10:1 to 1:10, more preferably in the range of 3:1 to 1:3 and most preferably in the range of 2:1 to 1:2. It has been found that as the ratio of the melt viscosity changes from a ratio of 1:1, the lower viscosity material has a tendency to migrate to the high shear portion of the extrusion die and create an area rich in that material.

If desired a low adhesion backsize (LAB) can be melt processed into or onto one or both of surfaces 12 and 14. the resulting construction will still exhibit pressure-sensitive properties although they may be somewhat less than if no LAB were employed. In order to be melt processable, however, the LAB must be extrudable under the conditions employed during manufacture of the tape. It is also, possible, however, to apply the LAB via conventional coating techniques after the tape has been coextruded. LAB materials useful herein include polyolefins, cured silicones, polymethyl pentene, poly 1-octene, blends of silicones with polyethylene, blends of fluorochemicals with polypropylene, polyethylene, polyurethanes, or fluorochemicals grafted to polyolefins or similar polymers and the like.

LAB materials are described in the literature. See for example, U.S. Pat. Nos. 2,532,011; 2,607,711; and 3,318,852.

The tape of the invention may be made by a melt processing technique in which at least two molten streams of a pressure-sensitive adhesive composition and, optionally, streams of other melt processable materials are combined together, preferably in proximity to the outlet of an extrusion die, so as to form a unified structure. Molten streams of other materials may also be advantageously combined with the adhesive streams in the practice of the invention. In a novel of the melt processing technique, the tape is made by:

a) providing at least two molten streams of a first and second pressure-sensitive adhesive composition;

b) combining said molten streams into a single unified, molten structure having first and second outer surfaces;

c) depositing said unified, molten structure onto a solid substrate, and d) cooling said molten structure before the structure passes through a nip.

Figure 2:
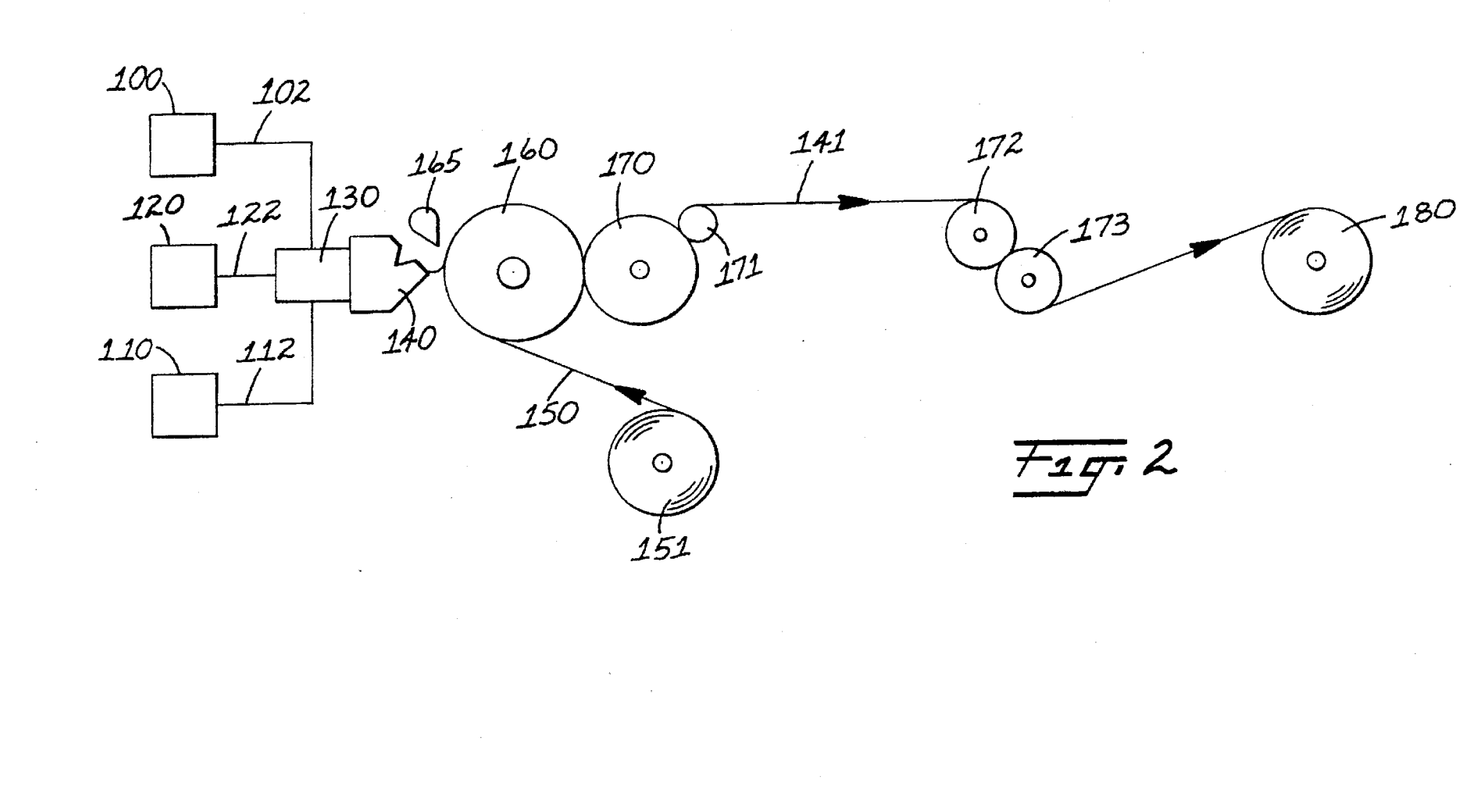
FIG. 2 shows a schematic diagram of a system used to manufacture the tape invention.

Preferably, the tape is manufactured using a coextrusion technique in which the various molten streams are transported to an extrusion die outlet and joined together in the proximity of said outlet. A coextrusion technique useful in the invention is schematically shown in FIG. 2. With reference to FIG. 2, extruders 100, 110, and 120 are shown. Extruders 100 and 110 provide molten streams of 102 and 112 of the first and second pressure-sensitive adhesive composition to a feedblock 130. Extruder 120 provides a molten stream of a third material, such as a carrier material 122, to feedblock 130. It is of course understood that if no third material is desired, there is no need to utilize extruder 120. It is further understood that only one extruder is needed to deliver the pressure sensitive adhesive composition to the feedblock. In the event that only one extruder is employed, the melt stream is split into the number of streams (e.g. two or more) of the adhesive to be utilized in the tape.

Feedblock 130 combines the molten streams into a single flow channel. The distinct layers of each material are maintained at this time because of the laminar flow characteristics of the streams. The feedblock delivers or transports the now unified, molten structure to the extrusion die 140 where it is reduced in height and increased in width so as to provide a relatively thin and wide construction.

The extruders 100, 110 and 120 are in effect "pumps" for delivery of the molten streams to the extrusion die. The precise extruder employed is not critical to the process. However, it is understood that the design of the extruder screw will influence the ability of the extruder to provide good melt quality, temperature uniformity, throughput and the like. A number of useful extruders are known and include single and twin screw extruders, batch-off extruders and the like. These extruders are available from a variety of vendors including Davis-Standard Extruders, Inc. (Pawcatuck, Conn.), Black Clawson Co. (Fulton, N.Y.), Berstorff Corp (N.C.), Farrel Corp. (Conn.), Moriyama Mfg. Works, Ltd. (Osaka, Japan).

Other "pumps" may also be employed to deliver the molten streams to the extrusion die. They include drum unloaders, bulk melters, gear pumps, etc. These are available from a variety of vendors, including Graco LTI (Monterey, Calif.), Nordson (Westlake, Calif.), Industrial Machine Manufacturing (Richmond, Va.), Zenith Pumps Div., Parker Hannifin Corp., (N.C.).

Once the molten streams have exited the pump, they are typically transported to the die through transfer tubing and/or hoses. It is preferable to minimize the amount of residence time in the tubing so as to avoid problems of, for example, melt temperature variations. This can be accomplished by a variety of techniques, including minimizing the length of the tubing, providing appropriate temperature control of the tubing, and utilizing static mixers in the tubing to maintain a homogeneous temperature in the tubing.

The use of a feedblock is optional as a variety of coextrusion die systems are known. Thus, for example, multimanifold dies may also be employed. Examples of feedblocks and extrusion dies useful in the invention are the Cloeren "Vane" dies and Cloeren coextrusion feedblocks and multimanifold dies available commercially from The Cloeren Company of Orange, Tex. Such dies are described in, for example, U.S. Pat. Nos. 4,152,387; 4,197,069; 4,600, 550; 4,619,802; 4,780,258; and 4,789,513. Other coextrusion dies and feedblocks are available from Extrusion Dies Inc. (Chippewa Falls, Wis.), ER-WE-PA (GA), Egan Machinery Division, John Brown Inc. (NJ), and Welex Inc. (PA).

The selection of the feedblock and/or extrusion die to be utilized is not critical to the practice of the process. However, it is noted that certain factors do influence the performance of the extrusion process. For example, because feedblocks require materials to flow in contact through a single manifold after the point of confluence, the relative viscosities of the materials and their ability to be processed at a single manifold temperature must be considered. When the relative viscosities of the materials exceed 4:1 or when a single manifold temperature cannot be tolerated by the materials, multimanifold dies are typically employed. In multimanifold dies, each material flows in its own manifold to the point of confluence. Each individual manifold can be designed specifically for the rheology of each resin. Also each manifold can be controlled at a different process temperature.

Multimanifold dies can also be designed with zero common land length so that the materials do not meet until the die lip or exit orifice. Alternatively they can be designed with a short common flow channel. A zero common land would be preferred when molten streams with extreme viscosity differences (e.g., ratio of 400:1+) are employed. For more moderate viscosity differences (e.g., ratio of 10:1 or less), a short common land can be beneficial because the period of high temperature and high pressure while the melts are in the common land can improve the bond strength between the layers of the composite tape.

The extrusion die 140 deposits the unified, molten structure onto a solid substrate (here indicated as a release liner 150) supplied from a roll 151 so that the first surface of the structure is in contact with the liner (a solid substrate) while the second surface of the structure is a free surface (i.e., it is not in contact with any other solid surface). Tape 141 results. The liner 150 contacts the surface of a casting wheel 160 and is interposed between the surface of the casting wheel and the molten stream. However, the use of liner 150 in the process is optional. Thus, the molten structure can be deposited directly onto the surface of casting wheel 160. The liner can be subsequently applied to one surface of the tape of the invention later in the process, for example at nip roll 170.

The casting wheel is typically maintained at a temperature less than the temperature of the unified molten structure. Typically this is a temperature in the range of from 5° to 150° C. (preferably from 30°–105° C.).

When a tape such as that illustrated in FIG. 1B is made, the adhesive layers 16 and 18 blanket carrier layer 19. This enables one to make a tape with a carrier which has a tailored thermal history and, accordingly, various physical properties as a result of that thermal history. Applicants are unaware of any other tape or method of making the same which provides this feature.

It has been found that for certain carrier layer materials, such as polypropylene, cooling and solidifying the molten structure slowly results in an embrittled carrier layer. Tapes made in this manner are hand tearable. If, however, the unified molten structure is cooled and solidified rapidly, a more ductile carrier layer results. Tapes made in this manner have high elongation at break and stretch significantly when hand torn.

An air knife 165 may be used to force the molten unified structure against the liner 150 if desired.

The unified structure is then "nipped" between casting wheel 160 and nip roll 170. If desired, the unified structure can then pass through a series of rolls 171, 172, 173 and then can be wound as roll 180. Alternatively, the tape can be removed from the liner and wound upon itself as roll 180. The liner can be recovered and reused if desired. Desired widths and/or lengths of the tape can then be cut using techniques known to the art.

A number of additional steps can optionally be performed if desired. Thus, for example, the tape may be uniaxially or biaxially oriented, it can be post cured (such as through heat, electromagnetic radiation, etc.), or it can be dusted with various tack-reducing agents. Furthermore, LAB coatings can also be applied at this point.

The present invention is further described with reference to the following non-limiting examples. In these examples, the following properties were tested according to the following test methods:

TEST METHODS

The tapes described in this invention were characterized by the following test methods:

ASTM-D3330 for tape peel adhesion to stainless steel (SS) and polypropylene (PP) (90° and 180° peel angles) and for tape liner release.

ASTM-D3654 for shear failure of a 2.54 cm by 2.54 cm (1"×1") sample both at room temperature and at elevated temperatures.

ASTM-D412 for tensile elongation at break.

EXAMPLE 1

A coextruded pressure-sensitive adhesive tape according to the invention was prepared using a single manifold extrusion die coupled to a three layer coextrusion feedblock. The die was an Ultraflex™ 40 model fabricated by Extrusion Dies Incorporated (Chippewa Falls, Wis.). Its internal flow channel was comprised of a inlet channel, a primary manifold, a secondary manifold, and a final land. The die had a manually adjusted flexible lip and two independently controlled temperature zones, one in each die half. The die orifice was 25.4 cm (10 in.) wide and was cut to a height of 0.1016 cm (0.040 in.). The inlet channel of the die was designed to accept the output of the feedblock which was bolted to the die. The feedblock was fabricated by Cloeren Company (Orange, Tex.). It included three inlet ports, a selector plug, three manifolds, two adjustable vanes between the manifolds, and two distribution pins. This feedblock had two independently controlled temperature zones. For this example, an ABA selector plug was used so that the outer two feedblock manifolds were fed with the same polymer from the same extruder. The adjustable vanes were located to divide the total cross sectional area into thirds. No profile was cut into the distribution pins.

Fitted to the "A" inlet of the feedblock was a transfer tube from a hot-melt acrylate extrusion processing apparatus. This was comprised of a Bonnot batch-off extruder joined in cascade to a 5.08 cm (2 in.) diameter single screw extruder (available from Berlyn Corp., Worcester, Mass.) through an inlet port at zone No. 3 of this extruder. This extruder was electrically heated and water cooled. At the head of this extruder, a Berlyn screen pack and a Nichols Zenith PEP gear pump (available from Parker Hannifin Corp., Waltham, Mass.) was employed.

Fitted to the "B" inlet of the feedblock was a transfer tube from a 3.175 cm (1.25 in.) diameter single screw extruder (available from Killion Extruders, Inc., Cedar Grove, N.J.) for processing the carrier resin. This extruder used a single stage, single flight, 3:1 compression ratio screw to process the polypropylene resin used in this example. This extruder barrel was electrically heated and air cooled.

The above extrusion apparatus was operated at the following temperatures and speeds:

Die temperature, Zone 1=166° C. (330° F.)
Die temperature, Zone 2=166° C. (330° F.)
Feedblock temperature, Zone 1=166° C. (330° F.)
Feedblock temperature, Zone 2=166° C. (330° F.)
PSA extruder, Zone 3–7 temp.=166° C. (330° F.)
Gear pump temperature=166° C. (330° F.)
PSA transfer tube temperature=166° C. (330° F.)
Carrier extruder, Zone 1 temperature=138° C. (280° F.)
Carrier extruder, Zone 2 temperature=216° C. (420° F.)
Carrier extruder, Zone 3 temperature=249° C. (480° F.)
Carrier transfer tube temperature=249° C (480° F.)
Bonnot speed setting=5
PSA extruder screw speed=38 RPM
Gear pump speed=33 RPM
Carrier extruder screw speed=42 RPM The feedblock/single manifold die was mounted in an approximately horizontal attitude with the die orifice within 1.0 cm (0.4 in.) of the surface of a casting wheel (Roll A). A silicone coated paper liner was unwound onto Roll A so as to make contact with the roll surface approximately one quarter of the roll circumference before the die orifice. As the liner moved past the orifice, being driven by Roll A, the composite melt was laid onto the liner. This step was aided by the impingement of air from an air knife (available from Marshall and Williams Co., Providence, R.I.) to minimize the entrapment of air between the melt and the incoming liner. The temperature of Roll A was controlled by circulating water through the roll's interior. This temperature control allows the process to effect the final product properties by quenching or slow cooling the composite tape. Roll A was 30.5 cm (12 in.) in diameter and was covered with 0.635 cm (0.25 in.) of silicone rubber.

The nip roll (Roll B) acted as a nip on the web to isolate the web tension from subsequent web handling steps. Roll B was 15.2 cm (6 in.) in diameter and was covered with a No. 924 plasma coating (available from Plasma Coatings Incorporated, Waterbury Conn.). Roll B was also temperature controlled by circulating water through its interior.

After removal from Roll B, the web edges were trimmed and the liner and tape were wound onto themselves around a core using a center driven winder.

The web handling apparatus in Example 1 was operated at the following temperatures and speeds:

Roll A temperature=104° C. (220° F.)
Roll B temperature=38° C. (100° F.)
Web line speed=12.2 meters per minute (40 feet per minute FPM)

The finished tape in Example 1 is described below. The acrylate pressure-sensitive adhesive was prepared as described in Example 5 of U.S. Pat. No. Re. 24,906:

Faceside Adhesive Composition—Acrylate pressure-sensitive adhesive
Carrier Composition—Polypropylene Exxon Escorene™ 3014 (12 melt flow rate (MFR))
Backside Adhesive Composition—Acrylate pressure-sensitive adhesive
Faceside Adhesive Thickness—0.038 mm (1.5 mils)
Carrier Thickness—0.025 mm (1.0 mil)
Backside Adhesive Thickness—0.038 mm (1.5 mils)
Liner—Silicone coated paper, 60# (0.098 kg/m$^2$) basis weight The finished tape had the following properties:
180 degree Peel Adhesion to SS, faceside—0.85 N/mm (39 oz per half inch)
180 degree Peel Adhesion to SS, backside—0.74 N/mm (34 oz per half inch)
180 degree Peel Adhesion to PP, faceside—0.70 N/mm (32 oz per half inch)
180 degree Peel Adhesion to PP, backside—0.59 N/mm (26 oz per half inch)
Liner Release—0.59 grams force/mm
Room Temp. Shear, faceside, 1000 grams—220 minutes
Room Temp. Shear, backside, 1000 grams—450 minutes
Oven Shear, 70° C. (158° F.), 500 grams—18 minutes
Elongation at Break—80%

EXAMPLE 2

Example 1 was repeated with a second acrylate PSA formulation at the following process control set points:
Die temperature, Zone 1=177° C. (350° F.)
Die temperature, Zone 2=177° C. (350° F.)
Feedblock temperature, Zone 1=177° C. (350° F.)
Feedblock temperature, Zone 2=177° C. (350° F.)
PSA extruder, Zone 3–7 temperatures=177° C. (350° F.)
Gear pump temperature=177° C. (350° F.)
PSA transfer tube temperature=177° C. (350° F.)
Carrier extruder, Zone 1 temperature=138° C. (280° F.)
Carrier extruder, Zone 2 temperature=216° C. (420° F.)
Carrier extruder, Zone 3 temperature=232° C. (450° F.)
Carrier transfer tube temperature=232° C. (450° F.)
Bonnot speed setting=2.8
PSA extruder screw speed=13 RPM
Gear pump speed=19 RPM
Carrier extruder screw speed=18 RPM The web handling apparatus for Example 2 was the same as Example 1, except the web speed was 5.48 meters per minute (18 FPM).

The finished tape in Example 2 is described below. The acrylate pressure-sensitive adhesive was prepared according to the disclosures of U.S. Pat. No. 4,833,179:

Faceside Adhesive Composition—Acrylate pressure-sensitive adhesive
Carrier Composition—Polypropylene Exxon Escorene™ 3014 (12 MFR)
Backside Adhesive Composition—Acrylate pressure sensitive adhesive
Backside Adhesive Thickness—0.038 mm (1.5 mils)
Carrier Thickness—0.025 mm (1.0 mil)
Faceside Adhesive Thickness—0.038 mm (1.5 mils)
Liner—Silicone coated paper, 60# (0.098 kg/m$^2$) basis weight The finished tape in Example 2 had the following properties:
180 degree Peel Adhesion to SS, faceside—0.85 N/mm (39 oz per half inch)
180 degree Peel Adhesion to SS, backside—0.72 N/mm (34 oz per half inch)
180 degree Peel Adhesion to PP, faceside—0.66 N/mm (30 oz per half inch)
180 degree Adhesion to PP, backside—0.55 N/mm (25 oz per half inch)
Liner Release—0.59 grams force/mm
Room Temp. Shear, faceside, 1000 grams—1500 minutes
Room Temp. Shear, backside, 1000 grams—1500 minutes
Oven Shear, 70° C. (158° F.), 500 grams—500 minutes

EXAMPLE 3

The extrusion and web handling apparatus and conditions employed in this example were the same employed in Example 1, except the web speed was increased to 24 meters per minute (80 FPM) to manufacture a 0.051 mm (2 mil) thick tape with a thin carrier layer.

The finished tape in Example 3 is described below:
Faceside Adhesive Composition—Acrylate pressure-sensitive adhesive
Carrier Composition—Polypropylene Exxon Escorene™ 3014 (12 MFR)
Backside Adhesive Composition—Acrylate pressure-sensitive adhesive
Faceside Adhesive Thickness—0.019 mm (0.75 mils)
Carrier Thickness—0.013 mm (0.5 mils)
Faceside Adhesive Thickness—0.019 mm (0.75 mils)
Liner—Silicone coated paper, 60# (0.098 kg/m$^2$) basis weight The finished tape had the following properties:
180 degree Peel Adhesion to SS, faceside—0.64 N/mm (29 oz per half inch)
180 degree Peel Adhesion to SS, backside—0.55 N/mm (25 oz per half inch)
180 degree Peel Adhesion to PP, faceside—0.54 n/mm (24 oz per half inch)

180 degree Peel Adhesion to PP, backside—0.48 N/mm (22 oz per half inch)

Liner Release—0.39 grams force/mm

Room Temp. Shear, faceside, 1000 grams—190 minutes

Room Temp. Shear, backside, 1000 grams—250 minutes

Oven Shear, 70° C. (158° F.), 500 grams—15 minutes

EXAMPLE 4

This example demonstrates a hand tearable tape. The polypropylene backing in this tape was highly embrittled due to the crystalline morphology possible from the ultra-slow cooling rate of the center carrier layer which was blanketed in the multilayer melt by hot adhesive outer layers. The blanketing effect, provided by coextrusion, combined with specific extrusion and web handling parameters, produced a tape which hand tore. Such a tape could not be easily fabricated by a traditional method, but was possible by this invention because the carrier layer was processed as part of the composite.

Using the same extrusion apparatus and web handling apparatus as in Example 1, hand tearable tapes were possible using a pure polypropylene homopolymer because the web path design allowed the blanketed tape to slow cool. In addition, by delaying the adhesive side contact until the web had undergone initial cooling, adhesive texturing was minimized.

The above extrusion apparatus was operated at the following temperatures and speeds:

Die temperature, Zone 1=166° C. (330° F.)
Die temperature, Zone 2=166° C. (330° F.)
Feedblock temperature, Zone 1=171° C. (340° F.)
Feedblock temperature, Zone 2=171° C. (340° F.)
PSA extruder, Zone 3–7 temperatures=166° C. (330° F.)
Gear pump temperature=166° C. (330° F.)
PSA transfer Tube temperature=166° C. (330° F.)
Carrier extruder, Zone 1 temperature=138° C. (280° F.)
Carrier extruder, Zone 2 temperature=209° C. (408° F.)
Carrier extruder, Zone 3 temperature=277° C. (530° F.)
Carrier transfer tube temperature=277° C. (530° F.)
Bonnot speed setting=1
PSA extruder screw speed=10 RPM
Gear pump speed=6 RPM
Carrier extruder screw speed=6 RPM The web handling apparatus was operated at the following temperatures and speeds:

Roll A temperature=104.4° C. (220° F.)
Roll B temperature=37.7° C. (100° F.)
Web line speed=2.65 meters per minute (8.7 FPM)

The finished tape, which utilized the same adhesive as used in Example 1, is described below:

Faceside Adhesive Composition—Acrylate pressure-sensitive adhesive
Carrier Composition—Polypropylene Exxon Escorene™ 3014 (12 MFR)
Backside Adhesive Composition—Acrylate pressure-sensitive adhesive
Faceside Adhesive Thickness—0.038 mm (1.5 mils)
Carrier Thickness—0.025 mm (1.0 mil)
Backside Adhesive Thickness—0.038 mm (1.5 mils)
Liner—Silicone coated paper, 60# (0.098 kg/m$^2$) basis weight The finished tape exhibited 11% elongation at break. A length of the tape on the liner was removed from a 2.54 cm (1 in.) wide roll of the tape. It was hand torn across the web and exhibited smooth and uniform hand tearability.

EXAMPLE 5

This example demonstrates another hand tearable tape. A polypropylene based blend was used for the carrier. The same process conditions were employed as in Example 4.

The finished tape, which employed the same adhesive as used in Example 1, is described below:

Faceside Adhesive Composition—Acrylate pressure-sensitive adhesive
Carrier Composition—
  66% Polypropylene Exxon Escorene™ 3014,
  2% Ethylene Vinyl Acetate DuPont Elvax™ 3190,
  30% Polymethylmethacrylate Rohm and Haas VM100,
  2% Blue color concentrate Polypropylene masterbatch, (available from C. B. Edwards, Minneapolis, Minn.).
Backside Adhesive Composition—Acrylate pressure-sensitive adhesive
Faceside Adhesive Thickness—0.038 mm (1.5 mils)
Carrier Thickness—0.025 mm (1.0 mil)
Backside Adhesive Thickness—0.038 mm (1.5 mils)
Liner—Silicone coated paper, 60# (0.098 kg/m$^2$) basis weight The finished tape exhibited 5% elongation at break. A length of the tape on the liner was removed from a 2.54 cm (1 in.) wide roll of the tape. It was hand torn across the web and exhibited smooth and uniform hand tearability.

EXAMPLE 6

To prepare Example 6, the feedblock/die in Example 1 was fitted with a hot-melt synthetic rubber PSA apparatus in place of the hot-melt acrylate apparatus described above. A drum unloader, designed and fabricated by Graco LTI (Monterey, Calif.), was used to remelt and pump a precompounded synthetic rubber PSA comprised of 100 parts by weight Shell Kraton™ 1107 copolymer and 100 parts by weight Shell Wingtack™ tackifier. The drum unloader had a heated platen and integral gear pump to melt and pump the PSA formulation. This apparatus was fitted to the "A" port of the Cloeren coextrusion feedblock.

The extrusion apparatus was operated at the following temperatures and speeds:

Die temperature, Zone 1=166° C. (320° F.)
Die temperature, Zone 2=166° C. (320° F.)
Feedblock temperature, Zone 1=177° C. (350° F.)
Feedblock temperature, Zone 2=177° C. (350° F.)
Drum Unloader platen temperature=166° C. (330° F.)
Drum Unloader hose temperature=171° C. (340° F.)
Carrier extruder, Zone 1 temperature=143° C. (290° F.)
Carrier extruder, Zone 2 temperature=204° C. (400° F.)
Carrier extruder, Zone 3 temperature=215° C. (420° F.)
Carrier transfer tube temperature=215° C. (420° F.)
Drum Unloader pump speed=33 RPM
Carrier extruder screw speed=44 RPM The web handling apparatus was operated at the following conditions:

Roll A temperature=38° C. (100° F.)
Roll B temperature=38° C. (100° F.)
Web line speed=9.8 meters per minute (32 FPM)

The finished tape is described below:

Faceside Adhesive Composition—Kraton™/Wingtack™
Carrier Composition—Polypropylene Exxon Escorene™ 3085 (35MFR)
Backside Adhesive Composition—Kraton™/Wingtack™
Faceside Adhesive Thickness—0.081 mm (3.25 mils)
Carrier Thickness—0.051 mm (2.0 mils)
Backside Adhesive Thickness—0.081 mm (3.25 mils)
Liner—Silicone coated paper, 60# (0.098 kg/m$^2$) basis weight The finished tape had the following properties:
180 degree Adhesion to Steel—1.66 N/mm (76 oz per half inch)
180 degree Adhesion to PP—1.64 N/mm (75 oz per half inch)
Liner Release—1.8 grams force/mm
Room Temp. Shear, 1000 grams—10,000 minutes
Oven Shear, 70° C. (158° F.), 500 grams—6000 minutes

EXAMPLE 7

This example is similar to Example 6, with the following exceptions. A 66 cm (26 inch) wide single manifold die, manufactured by the Cloeren Company (Orange, Tex.), was used. This die has three independently controlled temperature zones across its width. A 5.08 cm (2 inch) diameter single screw extruder (available from Killion Extruders, Inc., Cedar Grove, N.J.) was used to process the carrier layer. The vanes in the Cloeren feedblock were adjusted to provide a differential layer thickness between the two opposed outer adhesive layers.

The extrusion apparatus was operated at the following temperatures and speeds:
Die temperature, Zone 1=182° C. (360° F.)
Die temperature, Zone 2=182° C. (360° F.)
Die temperature, Zone 3=182° C. (360° F.)
Feedblock temperature, Zone 1=182° C. (360° F.)
Feedblock temperature, Zone 2=182° C. (360° F.)
Drum Unloader platen temperature=182° C. (360° F.)
Drum Unloader hose temperature=182° C. (360° F.)
Carrier extruder, Zone 1 temperature=138° C. (280° F.)
Carrier extruder, Zone 2 temperature=193° C. (380° F.)
Carrier extruder, Zone 3 temperature=227° C. (440° F.)
Carrier extruder, Zone 4 temperature=227° C. (440° F.)
Carrier transfer tube temperature=227° C. (440° F.)
Drum Unloader pump speed=32 RPM
Carrier extruder screw speed=25 RPM The web handling apparatus was operated at the following conditions:
Roll A temperature=18° C. (65° F.)
Roll B temperature=18° C. (65° F.)
Web line speed=15.2 meters per minute (50 FPM)

The finished tape is described below:
Faceside Adhesive Composition—Kraton™/Wingtack™
Carrier Composition—Polypropylene/Polyethylene Copolymer, Shell Chemical Company DS 7CO4N
Backside Adhesive Composition—Kraton™/Wingtack™
Faceside Adhesive Thickness—0.056 mm (2.2 mils)
Carrier Thickness—0.020 mm (0.8 mils)
Backside Adhesive Thickness—0.020 mm (0.8 mils)
Liner—Silicone coated paper, 78# (0.127 kg/m$^2$) basis weight

EXAMPLE 8

This example used the same extrusion apparatus and web handling apparatus as employed in Example 7. The flow rate of the carrier layer extruder was significantly reduced relative to the adhesive flow rate to make a tape which had a carrier less than 0.005 mm (0.2 mils) thick. This example, which would be difficult to fabricate by conventional methods, was possible with the present invention because the carrier layer is always processed as part of the greater composite.

This example also used the blanketing effect of the adhesive layers to make a low modulus tape which broke cleanly from the liner when stressed. The tape of this example is useful in commercial and industrial adhesive transfer tape applicators.

The extrusion apparatus was operated at the following temperatures and speeds:
Die temperature, Zone 1=182° C. (360° F.)
Die temperature, Zone 2=182° C. (360° F.)
Die temperature, Zone 3=182° C. (360° F.)
Feedblock temperature, Zone 1=182° C. (360° F.)
Feedblock temperature, Zone 2=182° C. (360° F.)
Drum Unloader platen temperature=182° C. (360° F.)
Drum Unloaded hose temperature=182° C. (360° F.)
Carrier extruder, Zone 1 temperature=138° C. (280° F.)
Carrier extruder, Zone 2 temperature=193° C. (380° F.)
Carrier extruder, Zone 3 temperature=227° C. (440° F.)
Carrier extruder, Zone 4 temperature=227° C. (440° F.)
Carrier transfer tube temperature=227° C. (440° F.)
Drum Unloader pump speed=40 RPM
Carrier extruder screw speed=6 RPM The web handling apparatus was operated at the following conditions:
Roll A temperature=104° C. (220° F.)
Roll B temperature=18° C. (65° F.)
Web line speed=24.4 meters per minute (80 FPM)

The finished tape is described below:
Faceside Adhesive Composition—Kraton™/Wingtack™
Carrier Composition—Polypropylene/Polyethylene Copolymer, Shell Chemical Company DS 7CO4N
Backside Adhesive Composition—Kraton™/Wingtack™
Faceside Adhesive Thickness—0.024 mm (0.95 mils)
Carrier Thickness—0.003 mm (0.12 mils)
Backside Adhesive Thickness—0.024 mm (0.95 mils)
Liner—Silicone coated paper, 42# (0.065 kg/m$^2$) basis weight

EXAMPLE 9

This example is similar to Example 6 except that the drum unloader that remelted the precompounded synthetic rubber adhesive was fitted to a twin-screw compounding extruder (available from American Leistritz Extruder Corp., Somerville, N.J.), which was in turn fitted to the feedblock. This allowed two solids to be dry fed and mixed into the adhesive formulation. These solids were flame retardant compounds. The vanes in the Cloeren feedblock were adjusted to provide a differential layer thickness between the two opposed outer adhesive layers.

The extrusion apparatus was operated at the following temperatures and speeds:
Die temperature, Zone 1=160° C. (320° F.)

Die temperature, Zone 2=160° C. (320° F.)
Feedblock temperature, Zone 1=177° C. (350° F.)
Feedblock temperature, Zone 2=177° C. (350° F.)
Drum Unloader platen temperature=160° C. (320° F.)
Drum Unloader hose temperature=160° C. (320° F.)
Carrier extruder, Zone 1 temperature=149° C. (300° F.)
Carrier extruder, Zone 2 temperature=177° C. (350° F.)
Carrier extruder, Zone 3 temperature=232° C. (450° F.)
Carrier transfer tube temperature=232° C. (450° F.)
Compounder, Zone 1 temperature=121° C. (250° F.)
Compounder, Zone 2 temperature=132° C. (270° F.)
Compounder, Zone 3 temperature=149° C. (300° F.)
Compounder, Zone 4 temperature=160° C. (320° F.)
Compounder transfer tube temperature—160° C. (320° F.)
Drum Unloader pump speed=14 RPM
Carrier extruder screw speed=9 RPM
Compounder screw speed=99 RPM The web handling apparatus was operated at the following conditions:

Roll A temperature=38° C. (100° F.)
Roll B temperature=38° C. (100° F.)
Web line speed=7.3 meters per minute (24 FPM)

The finished tape is described below:

Faceside Adhesive Composition—85 weight % Kraton™/Wingtack™, 15 weight % flame retardant additives.
  (3 parts decabromodiphenyl oxide/1 part antimony trioxide)
Carrier Composition—Polypropylene Exxon Escorene™ 3085
Backside Adhesive Composition—85 weight % Kraton™/Wingtack™ 15 weight % flame retardant additives
  (3 parts decabromodiphenyl oxide/1 part antimony trioxide)
Faceside Adhesive Thickness—0.076 mm (3 mils)
Carrier Thickness—0.038 mm (1.5 mils)
Backside Adhesive Thickness—0.038 mm (1.5 mils)
Liner—Silicone coated paper, 60# (0.098 kg/m$^2$) basis weight The finished tape had the following properties:

90 degree Adhesion to SS—1.66 N/mm (32 oz per half inch)
90 degree Adhesion to PP—1.64 N/mm (35 oz per half inch)
Room Temp. Shear, 1500 grams—10,000 minutes
Oven Shear, 70° C., 500 grams—1795 minutes
FAR25.853 Vertical Burn, Length—14 cm (5.5 in.)
FAR25.853 Vertical Burn, Time to Extinguish—0 seconds

EXAMPLE 10

To demonstrate a tougher tape construction, the extrusion and web handling apparatus in Example 6 were used at the conditions listed below to process a tape with a relatively thick carrier layer of linear low density polyethylene.

The extrusion apparatus was operated at the following temperatures and speeds:

Die temperature, Zone 1=176° C. (350° F.)
Die temperature, Zone 2=176° C. (350° F.)
Feedblock temperature, Zone 1=193° C. (380° F.)
Feedblock temperature, Zone 2=193° C. (380° F.)
Drum Unloader platen temperature=171° C. (340° F.)
Drum Unloader hose temperature=166° C. (330° F.)
Carrier extruder, Zone 1 temperature=149° C. (300° F.)
Carrier extruder, Zone 2 temperature=177° C. (350° F.)
Carrier extruder, Zone 3 temperature=221° C. (430° F.)
Carrier transfer tube temperature=221° C. (430° F.)
Drum Unloader pump speed=40 RPM
Carrier extruder screw speed=41 RPM The web handling apparatus was operated at the following conditions:

Roll A temperature=49° C. (120° F.)
Roll B temperature=24° C. (75° F.)
Web line speed=4.9 meters per minute (16 FPM)

The finished tape is described below:

Faceside Adhesive Composition—Kraton™/Wingtack™
Carrier Composition—Linear Low Density Polyethylene, Dow Dowlex™ 3085
Backside Adhesive Composition—Kraton™/Wingtack™
Faceside Adhesive Thickness—0.030 mm (1.2 mils)
Carrier Thickness—0.122 mm (4.8 mils)
Backside Adhesive Thickness—0.030 mm (1.2 mils)
Liner—Silicone coated paper, 60# (0.098 kg/mn$^2$) basis weight
Mechanical Characteristics—tough, stretchy.

EXAMPLE 11

This example demonstrates a coextruded, two-sided pressure sensitive adhesive tape which has a foamed thermoplastic backing layer. The backing layer was foamed using a chemical blowing agent, although other mechanical or physical blowing agents could be used.

Foamed backings bring several benefits, including:
1) High loft tapes—important to some applications, like adhering carpets to floors.
2) Reduced density—for weight sensitive applications.
3) Specific mechanical properties—foams have unique compressive, vibration, and load recovery properties.

This example used the general extrusion and web handling apparatus used in Example 6, except a 25.4 cm (10 in.) wide single manifold die with a shortened final land length was substituted for the conventional manifold die (available from Extrusion Dies, Inc., Chippewa Falls, Wis.). This die did not have a secondary manifold. To incorporate the chemical blowing agent into the carrier layer extruder, the components were dry blended in a batch mode and transferred to the extruder hopper. The chemical blowing agent used in this example was Safoam™ FP (available from Reedy International Corp., N.J.). This chemical blowing agent degrades to carbon dioxide and nitrogen during the extrusion process, and as the carrier layer exits the die into an ambient atmospheric pressure, the gasses expand to form the cells of the foam.

The extrusion apparatus was operated at the following temperatures and speeds:

Die temperature, Zone 1=160° C. (320° F.)
Die temperature, Zone 2=160° C. (320° F.)
Feedblock temperature, Zone 1=177° C. (350° F.)
Feedblock temperature, Zone 2=177° C. (350° F.)
Drum Unloader platen temperature=160° C. (320° F.)
Drum Unloader hose temperature=160° C. (320° F.)
Carrier extruder, Zone 1 temperature=149° C. (300° F.)

Carrier extruder, Zone 2 temperature=204° C. (400° F.)
Carrier extruder, Zone 3 temperature=232° C. (450° F.)
Carrier transfer tube temperature=215° C. (420° F.)
Drum Unloader pump speed=20 RPM
Carrier extruder screw speed=42 RPM
The web handling apparatus was operated at the following conditions:
Roll A temperature=66° C. (150° F.)
Roll B temperature=66° C. (150° F.)
Web line speed=5.2 meters per minute (17 FPM)
The finished tape is described below:
Faceside Adhesive Composition—Kraton™/Wingtack™
Carrier Composition—
 99.5 Weight % Low Density Polyethylene, Eastman Tenite™ 1550P,
 0.5 Weight % Reedy Safoam™ FP (activated).
Backside Adhesive Composition—Kraton™/Wingtack™
Faceside Adhesive Thickness—0.102 mm (4 mils)
Carrier Thickness—0.330 mm (13 mils)
Backside Adhesive Thickness—0.051 mm (2 mils)
Liner—Silicone coated paper, 60# (0.098 kg/m$^2$) basis weight

EXAMPLE 12

In this example, a 45.72 cm (18 in.) wide three manifold "Vane" die was used (available from Cloeren Company, Orange, Tex.). This die was modified to hold an insert in the pathway of the carrier material and split the stream of the carrier material into a predetermined number of individual streams these streams provided continuous machine direction (i.e., down web) strands of the carrier material. These strands were separated from one another by adhesive in the cross-web direction at a spacing defined by the geometry of the insert. The adhesive covered the fibers on the opposed surfaces of the extrudate.

Because of relatively thin adhesive layers directly over the carrier domains, compared to the adhesive mass between the domains, a greatly differing adhesion of the tape to a substrate can be achieved by varying the force of application. A high normal force deforms the strands, exposing the substrate to the adhesive mass between the strands.

This example exhibits extreme anisotropy in tensile properties, tear resistance, adhesion, and shear.

The extruders and web handling apparatus used with this die were similar those employed in Example 6.

The extrusion apparatus was operated at the following temperatures and speeds:
Die temperature, Zone 1=182° C. (360° F.),
Die temperature, Zone 2=182° C. (360° F.)
Drum Unloader platen temperature=160° C. (320° F.)
Drum Unloader hose temperature=160° C. (320° F.)
Carrier extruder, Zone 1 temperature=138° C. (280° F.)
Carrier extruder, Zone 2 temperature=193° C. (380° F.)
Carrier extruder, Zone 3 temperature=210° C. (410° F.)
Carrier transfer tube temperature=204° C. (400° F.)
Drum Unloader pump speed=50 RPM
Carrier extruder screw speed=7.3 RPM
The web handling apparatus was operated at the following conditions:
Roll A temperature=38° C. (100° F.)
Roll B temperature=16° C. (60° F.)
Web line speed=5.48 meters per minute (18 FPM)
The finished tape is described below:
Faceside Adhesive Composition—Kraton™/Wingtack™
Carrier Composition—Polypropylene Exxon Escorene™ 3085 (35MFR)
Backside Adhesive Composition—Kraton™/Wingtack™
Nominal Total Thickness—0.102 mm (4.0 mils)
Carrier Domain Diameters—0.081 mm (3.25 mils)
Liner—Silicone coated paper, 60# (0.098 kg/m$^2$) basis weight The tape had approximately 6 strands per 2.54 cm (in.) width.

We claim:

1. A composite pressure-sensitive adhesive tape having two exterior surfaces of a normally tacky pressure-sensitive adhesive, the tape comprising a unified structure of first and second simultaneously melt processed pressure-sensitive adhesive layers each comprising an elastomeric polymer, and optionally a third simultaneously melt processed layer between said first and second pressure-sensitive adhesive layers, wherein said third layer is essentially free from the elastomeric polymer used in the pressure-sensitive adhesive used in said first and second pressure-sensitive adhesive layers, and further wherein at least one of said pressure-sensitive adhesive layers has been cross linked.

2. A composite pressure-sensitive adhesive tape according to claim 1 wherein there is no said third layer between said first and second pressure-sensitive adhesive layers, and wherein said first and second pressure-sensitive adhesive layers are essentially permanently joined to each other in said unified structure.

3. A composite pressure-sensitive adhesive tape according to claim 1 wherein said elastomeric polymer of said pressure-sensitive adhesive is selected from the group consisting of random copolymer adhesives, block copolymer adhesives, and natural rubber adhesives.

4. A composite pressure-sensitive adhesive tape according to claim 1 wherein said layers are coextruded.

5. A composite pressure-sensitive adhesive tape according to claim 1 wherein said third layer is present.

6. A composite pressure-sensitive adhesive tape according to claim 5 wherein said third layer is an adhesive layer.

7. A composite pressure-sensitive adhesive tape according to claim 5 wherein said third layer is a non-adhesive layer.

8. A composite pressure-sensitive adhesive tape according to claim 1 wherein the composition of said first and second pressure-sensitive adhesive layers is substantially the same.

9. A composite pressure-sensitive adhesive tape according to claim 1 wherein the composition of said first and second pressure-sensitive adhesive layers is not substantially the same.

10. A composite pressure-sensitive adhesive tape according to claim 1 wherein the ratio of the melt viscosity of any one of the simultaneously melt processed layers to any other of the simultaneously melt processed layers is in a range of from 10:1 to 1:10.

11. A composite pressure-sensitive adhesive tape according to claim 10 wherein said ratio is in the range of 4:1 to 1:4.

12. A composite pressure-sensitive adhesive tape according to claim 10 wherein said ratio is in the range of 2:1 to 1:2.

13. A composite pressure-sensitive adhesive tape comprising first and second normally tacky pressure sensitive adhesive layers each comprising an elastomeric polymer and a carrier layer between said first and second pressure-sensitive adhesive layers, wherein said carrier layer is essentially free of the elastomeric polymer used in pressure-sensitive adhesive of either of said pressure-sensitive adhesive layers, and wherein all of said layers are simultaneously melt processed to form a unified structure.

14. A composite pressure-sensitive adhesive tape according to claim 13 wherein the individual layers of said structure are essentially inseparable therefrom.

15. A composite pressure-sensitive adhesive tape according to claim 13 wherein said carrier layer is essentially continuous.

16. A hand tearable pressure-sensitive adhesive tape according to claim 13.

17. A composite pressure-sensitive adhesive tape according to claim 13 wherein said carrier layer is discontinuous.

18. A composite pressure-sensitive adhesive tape according to claim 17 wherein said carrier layer comprises at least one rib disposed longitudinally therein.

19. A reinforced composite pressure-sensitive adhesive tape according to claim 18.

20. A composite pressure-sensitive adhesive tape according to claim 13 wherein said carrier layer is a foamed material.

21. A composite pressure-sensitive adhesive tape according to claim 13 wherein said carrier layer is less than 15 micrometers thick.

22. A composite pressure-sensitive adhesive tape according to claim 21 wherein said carrier layer is less than 5 micrometers thick.

23. A composite pressure-sensitive adhesive tape according to claim 22 wherein said carrier layer is at least 1 micrometer thick.

24. A composite pressure-sensitive adhesive tape construction having pressure-sensitive adhesive on both exterior surfaces thereof comprising two layers of a normally tacky pressure-sensitive adhesive each comprising an elastomeric polymer and a layer of an extrudable carrier therebetween, wherein said carrier layer is (a) thin relative to the thickness of at least one of said adhesive layers, and (b) essentially free from the elastomeric polymer used in the adhesive of either of said pressure-sensitive adhesive layers, and wherein each of said layers has been coextruded to form said tape.

25. An oriented composite pressure-sensitive adhesive tape according to claim 1.

26. A uniaxially oriented pressure-sensitive adhesive tape according to claim 25.

27. A biaxially oriented pressure-sensitive adhesive tape according to claim 26.

28. A composite pressure-sensitive adhesive tape comprising a melt processed, unified construction having a layer of a pressure-sensitive adhesive comprising an elastomeric polymer on each surface of a central layer, said central layer comprising a blend of two or more polymers, said blend being essentially free from the elastomeric polymer used in the pressure-sensitive adhesive used in said pressure-sensitive adhesive layers.

29. A hand tearable composite pressure-sensitive adhesive tape according to claim 28.

30. A composite pressure-sensitive adhesive tape according to claim 1 wherein said structure is cooled before passing through a nip.

31. A composite pressure-sensitive adhesive tape having two exterior surfaces of a normally tacky pressure-sensitive adhesive, the tape comprising a unified structure of first and second simultaneously melt processed pressure-sensitive adhesive layers each comprising an elastomeric polymer, and optionally a third simultaneously melt processed layer between said first and second pressure-sensitive adhesive layers, wherein said third layer is essentially free from the elastomeric polymer used in the pressure-sensitive adhesive used in said first and second pressure-sensitive adhesive layers, and further wherein the composite tape is oriented.

32. A composite pressure-sensitive tape according to claim 31 which is biaxially oriented.

33. A composite pressure-sensitive tape according to claim 32 which is uniaxially oriented.

34. A composite pressure-sensitive adhesive tape having two exterior surfaces of a normally tacky pressure-sensitive adhesive, the tape comprising a unified structure of first and second simultaneously melt processed pressure-sensitive adhesive layers each comprising an elastomeric polymer, and a third simultaneously melt processed layer between said first and second pressure-sensitive adhesive layers, wherein said third layer is essentially free from the elastomeric polymer used in the pressure-sensitive adhesive used in said first and second pressure-sensitive adhesive layers.

35. A composite pressure-sensitive adhesive tape according to claim 34 wherein said third layer is an adhesive layer.

36. A composite pressure-sensitive adhesive tape according to claim 34 wherein said third layer is a non-adhesive layer.

37. A composite pressure-sensitive adhesive tape according to claim 34 wherein the composition of said first and second pressure-sensitive adhesive layers is substantially the same.

* * * * *